Dec. 31, 1963
P. H. HARRER ETAL
3,115,737
HAY CONDITIONER
Filed Dec. 29, 1960
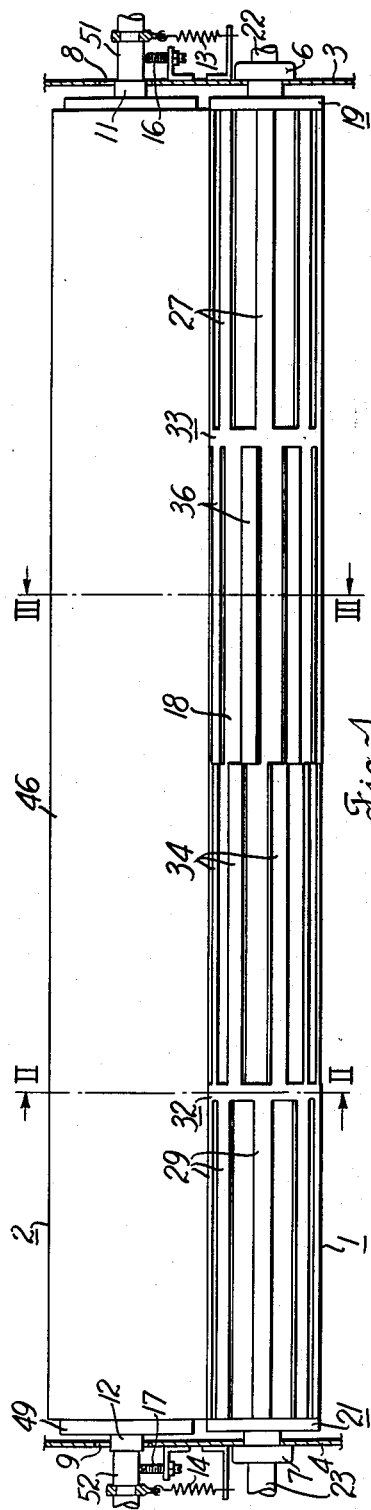
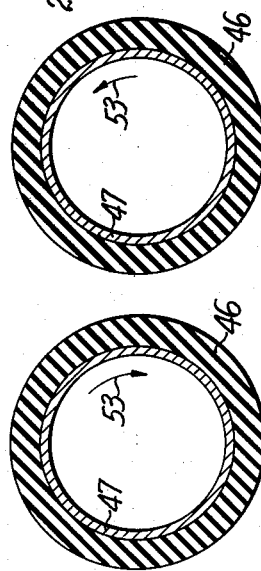
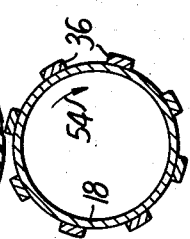
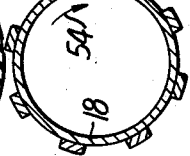
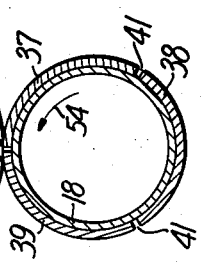
Inventors
Paul H. Harrer
William H. Shannon
by
Attorney United States Patent Office 3,115,737
Patented Dec. 31, 1963

3,115,737
HAY CONDITIONER
Paul H. Harrer and William H. Shannon, La Porte, Ind., assignors to Allis-Chalmers Manufacturing Company, Milwaukee, Wis.
Filed Dec. 29, 1960, Ser. No. 79,217
4 Claims. (Cl. 56—1)

The invention relates to crop conditioning equipment of the type which is used in the field for hastening the natural drying of grass crops or the like after cutting.

Heretofore known machines for the mentioned purpose are usually equipped with a pair of press rollers which are power driven in opposite directions so that a mat of cut crop material may be fed into and passed through the bite between the rollers. One of the rollers has a fixed axis of rotation and the other is floatingly mounted so that it can move toward and away from the companion roller.

The natural drying of a hay crop in the field is most desirably hastened by cracking the surface wax along the plants' stems, by applying pressure between the rollers that bruises but does not mangle, that cracks stems but does not chop them up into short pieces, that is gentle with leaves and does not crush and tear them off of stems.

Cracking the wax covering of stems without crushing or mangling leaves lets excess moisture out fast, helps to equalize the moisture content of both stems and leaves down to a safe storage level so that leaves remain attached to stems instead of shattering, thus saving the valuable protein, most of which is always in the leaves.

Excess crushing and mangling of plants causes rapid loss of vitamin A and carotene content. So does overlong exposure to hot sun's rays with resulting bleaching of leaves and stems.

During the past, different types and combinations of rollers have been suggested for use in crop conditioning machines. Smooth steel on steel rolls, corrugated gear type steel on steel, rubber on rubber, tire carcass type rubber rolls, and various smooth rough surfaced or corrugated combinations of rubber and steel have been tried but such earlier attempts are believed to have not accomplished the hereinabove outlined desirable results and to produce an entirely successful and satisfactory machine.

Generally, it is an object of the present invention to provide an improved crop conditioning device which will take care of the hereinabove outlined difficulties and requirements in a practical and entirely satisfactory manner.

A further object of the invention is to provide an improved crop conditioning device of the mentioned character which will handle the crop smoothly and evenly, with a minimum of power consumption and wear of its parts.

A further object of the invention is to provide an improved metal roller for a crop conditioning device, which will operate efficiently in conjunction with a companion roller of resilient rubberlike material.

A still further object of the invention is to provide an improved metal roller of the above mentioned character which is relatively simple in construction and which lends itself to manufacture by fabrication at relatively low costs.

These and other objects and advantages are attained by the present invention, various novel features of which will be apparent from the description herein and the accompanying drawing disclosing an embodiment of the invention, and will be more particularly pointed out in the appended claims.

In the drawing:

FIG. 1 is a side elevation of a pair of press rollers and associated parts, partly in section, for a crop conditioning machine;

FIG. 2 is an enlarged section on line II—II of FIG. 1;

FIG. 3 is an enlarged section on line III—III of FIG. 1;

FIG. 4 is a development, at a reduced scale, of one of the rollers shown in FIG. 1; and FIGS. 5 and 6 are sectional views showing details of construction of the lower and upper press rollers shown in FIG. 1.

The reference characters 1 and 2 in FIG. 1 generally designate a lower and an upper press roller, respectively, of a crushing device for a hay crop or the like. In conformity with well known engineering and manufacturing principles the rollers 1 and 2 may be incorporated in a crop conditioning machine comprising a wheeled frame and power transmitting means, not shown, for driving the rollers in opposite directions. Right and left frame parts 3 and 4 of the machine are indicated in FIG. 1 at the opposite ends of the rollers 1 and 2. The lower roller 1 is mounted in bearings 6 and 7 for rotation on a fixed axis, and the upper roller 2 is floatingly mounted for movement towards and away from the roller 1. The frame parts 3 and 4 have elongated openings 8 and 9, respectively, for accommodating bearings 11 and 12 of the upper roller, and these bearings in turn are mounted on suitable supports, such as swingable arms (not shown), to retain the roller 2 in accurate parallel relationship to the roller 1 while permitting translatory lateral movement thereof relative to the roller 1. A pair of coil springs 13 and 14 are operatively interposed between the roller 2 and the frame parts 3 and 4, respectively, as schematically indicated in FIG. 1, so as to exert a strong radial force upon the roller 2 urging it toward the roller 1. A pair of stop screws 16 and 17 are mounted on the frame parts 3 and 4, respectively, as schematically indicated in FIG. 1, in cooperative relation to the upper roller 2 so as to limit lateral movement of the upper roller toward the lower roller under the tension of the springs 13 and 14.

The roller 1 is fabricated and comprises a straight, cylindrical steel tube 18 to which axial and peripheral steel ribs are secured by welding as shown in FIGS. 1 and 4. The length of the tube 18 corresponds substantially to the overall length of the roller 1. As shown in FIG. 5, a cast hub 19 is secured, as by welding, to the right end of the tube 18, and a similar hub 21 is secured to the left end of the roller 1. Journals 22 and 23 are mounted, respectively, in the hubs 19 and 21 and are rotatably supported in the bearings 6 and 7, respectively.

As shown in FIG. 5, the hub 19 has a cylindrical skirt portion 24 within the tube 18 and a radially enlarged end portion 26 outside of the tube and in axial engagement therewith. A circumferential series of eight axial end ribs 27 are secured to the outside of the tube 18 at the right end of the roller 1 as shown in FIGS. 1 and 4. The ribs 27 are cut from steel bar stock and extend axially inward from the right end of the roller for a distance somewhat less than one-fourth of the length of the roller. The ribs 27 are equally spaced circumferentially from each other and their circumferential width is less than the circumferential spacing between successive ribs. The radial height of the ribs 27 is equal to the radial height to which the end portion 26 of the hub 19 projects beyond the cylindrical outer surface of the tube 18. The ribs 27 are secured to the tube 18 by axially spaced welds 28 some of which are indicated in FIG. 4. As also shown in FIGS. 1 and 4, the right ends of the ribs 27 axially abut the radially enlarged portion of the hub 19, and the radially outer surfaces of the ribs 27 are flush with the cylindrical outer surface of the hub portion 26.

The foregoing explanations with respect to the end ribs 27 analogously apply to a circumferential series of axial end ribs 29 which extend axially inward from the left end of the roller 1 as shown in FIGS. 1 and 4. The axial length of the end ribs 29 is the same as the axial length of the end ribs 27, and axially spaced welds 31, some of which are shown in FIG. 4, secure the ribs 29 to the outer surface of the tube 18. The ribs 29 and the radially enlarged outer end portion of the hub 21 are radially dimensioned the same as the ribs 27 and the hub portion 26 so that the radially outer surfaces of ribs 29 are flush with the cylindrical outer surface of the radially enlarged end portion of the hub 21 which, in turn, has the same diameter as the radially enlarged end portion 26 of the hub 19. The ribs 29 are circumferentially aligned with the ribs 27, as best shown in FIG. 4.

Intermediate the axial end ribs 27 and 29 the tube 18 is encircled by two axially spaced ring portions 32 and 33; and two circumferential series of external intermediate ribs 34 and 36 extend axially between the ring portions 32 and 33.

The ring portion 32 is composed of three identical arcuate bar sections 37, 38 and 39 which are curved concentrically with the tube 18 and fit snugly upon the cylindrical outer surface of the tube 18 as shown in FIG. 2. The arcuate length of each of the curved bars 37, 38 and 39 is approximately two radians, and gaps 41 between adjacent ends of the curved bars are shown in FIGS. 2 and 4. FIG. 4 further shows lateral gaps 42 between the curved bars 37, 38 and 39 and the adjacent ends of the axial end ribs 29; and lateral gaps 43 between the curved bars 37, 38 and 39 and the adjacent ends of the axial intermediate ribs 34. In the finished roller as shown in FIG. 1 none of the gaps 41, 42 and 43 are present because they are filled with welding material during the fabrication of the roller. The united curved bar sections 37, 38 and 39 provide a peripheral ring portion of the roller 1, and the radially outer surface of this ring portion is cylindrical, continuous and smooth, and flush with the radially outer surfaces of the end ribs 29 and intermediate ribs 34.

The foregoing explanations regarding the peripheral ring portion 32 analogously apply to the peripheral ring portion 33. As shown in FIG. 4, the ring portion 33 is composed of three bar sections 37', 38', 39' which, like the bar sections 37, 38, 39 of the ring portion 32, are curved concentrically with the tube 18 and secured together and to the adjacent ends of the end ribs 27 and intermediate ribs 36 by welding. The radially outer surface of the ring portion 33 is cylindrical, continuous, smooth and flush with the radially outer surfaces of the bars 27 and 36.

The axial intermediate ribs 34 and 36 correspond in number to the number of the end ribs 27 and 29. That is, eight intermediate ribs 34 are equally spaced circumferentially from each other in the left half of the space between the ring portions 32 and 33; and eight intermediate ribs 36 are equally spaced circumferentially from each other in the right half of the space between the rings 32 and 33. The width, thickness and length of the intermediate ribs 34 and 36 is the same as the width, thickness and length of the end ribs 27 and 29. Axially spaced welds 44, some of which are shown in FIG. 4, secure the intermediate ribs 34 and 36 to the outside of the tube 18.

The intermediate ribs 34 are staggered circumferentially relative to the end ribs 29; and the intermediate ribs 36 are staggered circumferentially relative to the intermediate ribs 34 as well as relative to the end ribs 27, as best shown in FIG. 4. The axially inner ends of the intermediate ribs 34 and 36 abut each other but are misaligned due to their relative staggering. All of the axial ribs 27, 29, 34 and 36, and the peripheral ring portions 32 and 33 are of equal radial dimensions.

The axial end ribs 29 and 27, the peripheral ring portion 26 of the hub 19 and the corresponding ring portion of the hub 21, the intermediate axial ribs 34, 36, and the peripheral ring portions 32, 33 present radially outer crushing surfaces of the metal roller 1. All of these crushing surfaces are spaced substantially equal distances from the axis of the roller 1.

The companion roller 2 is made of resilient rubberlike material and has a cylindrical outer surface in axially overlapping relation to the ribs 27, 29, 34, 36 and rings 32 and 33 of the metal roller 1. A rubber cylinder 46 of the roller 2 has an axial length coextensive with the effective length of the roller 1, as shown in FIG. 1, and the cylinder has a substantial wall thickness as shown in FIGS. 2 and 3, so that it will yield properly in operation of the device as will be explained more fully hereinbelow. Satisfactory results have been obtained with a rubber cylinder about six feet long and eleven inches in diameter, with a wall thickness of one inch, and the material of the cylinder having a durometer reading of about seventy.

As shown in FIGS. 1 and 2, the rubber cylinder 46 is supported by and bonded to a steel tube 47 which has a cast hub 48 at one end, and a similar hub 49 at the other. The hub 48 as shown in FIG. 6 is secured to the right end of the tube 47, as by welding, and the hub 49 is similarly secured to the left end of the tube 47. Journals 51 and 52 are mounted on the hubs 48 and 49, respectively, and are rotatably supported on the bearings 11 and 12, respectively.

In order to prepare the crushing device shown in FIG. 1 for operation the stop screws 16 and 17 are adjusted so that the cylindrical outer surface of the rubber cylinder 46 is spaced $1/64$ to $1/32$ of an inch from the cylindrical outer surfaces of the ring portions 32 and 33. Such spacing, because of its minuteness, does not appear in the drawings. The directions in which the rollers 1 and 2 are power driven in operation of the device are indicated by the arrows 53 and 54 in FIGS. 2 and 3.

Assuming that no crop material is fed into the bite of the rollers, neither the ribs 27, 29, 34 and 36 nor the rings 32, 33 of the metal roller 1 will contact the rubber roller 2, and the rollers will run smoothly without chattering or noise. When crop material is fed into the bite of the rollers the stems or stalks of the crop material will be pinched or cracked whenever they are pressed by the axial ribs 27, 29, 34 and 36 of the metal roller 1 against the relatively soft cylinder 46 of the rubber roller. The degree to which the stems or stalks are pinched or cracked depends on the amount of pressure which is exerted by the springs 13 and 14 upon the roller 2, and this pressure is adjustable by suitable means, not shown, so that only the natural wax covering of the plants, which is normally fine but tough and pliable, will be cracked. Such cracking will permit plant juices to ooze to the surface, and as a result the moisture content of the cut crop may be reduced to the desired degree by natural evaporation in a relatively short time.

While most of the crop material passing through the bite of the rollers 1 and 2 is subject to intermittent impact by the axial ribs 27, 29, 34 and 36, a small amount of the crop material rides over the ring portions 32 and 33, and presses against the portions of the rubber roller 2 directly opposite to the ring portions 32, 33. The tendency of the device to chatter and consume excessive power due to the intermittent impacts of the axial ribs 27, 29, 34 and 36 upon the crop material, and through the latter upon the roller 2, is thus greatly reduced. The rings 32 and 33 also insure smooth running of the rollers 1 and 2 despite any defletcions to which the roller 1 may become subjected in operation of the device.

The staggering of the intermediate ribs 34, 36 relative to each other and relative to the end ribs 27 and 29 contributes to the even feed and smooth operation of the device. The coaction of the metal roller 1 with the rubber roller 2 produces the desired cracking of the crop stems or stalks without subjecting the crop material to severe mangling and consequent tearing of leaves from the stems and loss of nutrients.

While in the foregoing a preferred embodiment of the invention has been described, it should be understood that it is not intended to limit the invention to the exact forms and details herein disclosed and that the invention includes such other forms and modifications as are embraced by the scope of the appended claims.

Having now particularly described and ascertained the nature of our said invention and the manner in which it is to be performed, we declare that what we claim is:

1. A crushing device of the character set forth comprising, a metal roller having external end ribs extending axially inward from its opposite ends, respectively, axially spaced peripheral ring portions between said end ribs, and external intermediate ribs extending axially between said ring portions; said end ribs, ring portions and intermediate ribs presenting radially outer crushing surfaces at substantially equal distances from the axis of said metal roller; and a companion roller of resilient rubberlike material having a cylindrical outer surface substantially coextensive in length with said metal roller and in axially overlapping relation to said crushing surfaces.

2. A metal roller for a hay conditioner of the character set forth, having external ribs extending axially inward from its opposite ends, respectively, and at least one peripheral ring portion spaced axially inward from said opposite roller ends said end ribs and peripheral ring portion presenting radially outer crushing surfaces at substantially equal distances from the axis of said metal roller.

3. A metal roller for a hay conditioner of the character set forth, having external end ribs extending axially inward from its opposite ends, respectively, and terminating in axially spaced relation to each other, axially spaced peripheral ring portions between said end ribs, and external intermediate ribs extending axially between said ring portions said end ribs, ring portions and intermediate ribs presenting radially outer crushing surfaces at substantially equal distances from the axis of said metal roller.

4. A crushing device of the character set forth comprising: a metal roller having external end ribs extending axially inward from its opposite ends, respectively, and at least one peripheral ring portion spaced axially inward from said opposite roller ends, said end ribs and peripheral ring portion presenting radially outer crushing surfaces at substantially equal distances from the axis of said metal roller; and a companion roller of resilient rubberlike material having a cylindrical outer surface in axially overlapping relation to said crushing surfaces of said metal roller.

References Cited in the file of this patent

UNITED STATES PATENTS

| | | |
|---|---|---|
| 1,954,635 | Leonard | Apr. 10, 1934 |
| 2,114,580 | Thompson | Apr. 19, 1938 |
| 2,176,607 | Daley | Oct. 17, 1939 |
| 2,416,123 | Siemen | Feb. 18, 1947 |
| 2,958,992 | Bornzin | Nov. 8, 1960 |
| 2,997,834 | Harbage et al. | Aug. 29, 1961 |

UNITED STATES PATENT OFFICE
CERTIFICATE OF CORRECTION

Patent No. 3,115,737                      December 31, 1963

Paul H. Harrer et al.

It is hereby certified that error appears in the above numbered patent requiring correction and that the said Letters Patent should read as corrected below.

Column 5, line 19, before "ribs" insert -- end --; line 22, after "ends" insert a semicolon --; column 6, line 4, after "portions", first occurrence, insert a semicolon.

Signed and sealed this 26th day of May 1964.

(SEAL)
Attest:

T W. SWIDER                                EDWARD J. BRENNER
ng Officer                                     Commissioner of Patents